United States Patent
Wisniewski

(10) Patent No.: US 12,542,249 B2
(45) Date of Patent: Feb. 3, 2026

(54) MAGNET INSTALLATION

(71) Applicant: Crestron Electronics, Inc., Rockleigh, NJ (US)

(72) Inventor: Stan Wisniewski, Pompton Plains, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 315 days.

(21) Appl. No.: 18/376,700

(22) Filed: Oct. 4, 2023

(65) Prior Publication Data
US 2025/0118506 A1    Apr. 10, 2025

(51) Int. Cl.
*H01H 13/04* (2006.01)

(52) U.S. Cl.
CPC ....... *H01H 13/04* (2013.01); *H01H 2223/016* (2013.01)

(58) Field of Classification Search
None
See application file for complete search history.

(56) References Cited

U.S. PATENT DOCUMENTS

| | | | | |
|---|---|---|---|---|
| 11,664,631 | B2* | 5/2023 | Owen | H05B 47/115 340/500 |
| 11,784,478 | B1* | 10/2023 | Nassim | H02G 1/00 174/502 |
| 2014/0326497 | A1* | 11/2014 | Byrne | H02G 3/18 174/541 |
| 2016/0204588 | A1* | 7/2016 | Trojanowski | H02G 3/081 174/66 |
| 2019/0148892 | A1* | 5/2019 | Smith | H05K 5/03 174/66 |
| 2023/0209756 | A1* | 6/2023 | Brower | H03K 17/962 174/66 |

* cited by examiner

*Primary Examiner* — Krystal Robinson
(74) *Attorney, Agent, or Firm* — Crestron Electronics, Inc.

(57) ABSTRACT

A magnet retaining pocket defined by a bore having a first bore portion and a second bore portion, wherein the first bore portion comprises a resilient tongue, and wherein the second bore portion contains an opening and a second attachment member recessed from the openings. The magnet is retained by the magnet retaining pocket by being inserted into the first bore portion to deflect the tongue and slid into the second bore portion, such that the first attachment member of the magnet engages the second attachment member of the second bore portion, until the magnet is exposed through the opening.

20 Claims, 5 Drawing Sheets

MAGNET INSTALLATION

BACKGROUND OF THE INVENTION

Technical Field

Aspects of the embodiments relate to magnet installation, for example for a magnet installation in a faceplate of a wall mounted control device.

Background Art

The popularity of home and building automation has increased in recent years partially due to increases in affordability, improvements, simplicity, and a higher level of technical sophistication of the average end-user. Generally, automation systems integrate various electrical and mechanical system elements within a building or a space, such as a residential home, commercial building, or individual rooms, such as meeting rooms, lecture halls, or the like. Examples of such system elements include heating, ventilation and air conditioning (HVAC), lighting control systems, audio and video (AV) switching and distribution, motorized window treatments (including blinds, shades, drapes, curtains, etc.), occupancy and/or lighting sensors, and/or motorized or hydraulic actuators, and security systems, to name a few.

One way a user can be given control of an automation system is through the use of one or more control devices, such as keypads. A keypad is typically mounted in a recessed receptacle in a building wall, commonly known as a wall or a gang box, and comprises one or more buttons or keys each assigned to perform a predetermined or assigned function. A decorative faceplate is used to cover the gap between the buttons and the wall. Faceplates are typically installed via screws, which are unsightly. To provide a screwless faceplate, typically a two piece faceplate is provided with a first faceplate portion that screws to the control device and a front decorative portion that snaps to the first faceplate portion via snaps. However, the snaps may break when the second faceplate portion needs to be removed, for example to service the control device. Magnets may be instead used to secure the faceplate portions together. But they are typically secured to the faceplate using adhesive, which is time consuming and cumbersome to apply during production and is also prone to losing its bonding properties over time.

Accordingly, a need has arisen for an apparatus, system, and method for an improved magnet installation.

SUMMARY OF THE INVENTION

It is an object of the embodiments to substantially solve at least the problems and/or disadvantages discussed above, and to provide at least one or more of the advantages described below.

It is therefore a general aspect of the embodiments to provide an apparatus, system, and method for an improved magnet installation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments a faceplate is provided for a control device. The faceplate comprises a magnet comprising a first attachment member and a magnet retaining pocket defined by a bore having a first bore portion and a second bore portion. The first bore portion comprises a resilient tongue and the second bore portion contains an opening and a second attachment member recessed from the openings. The magnet is retained by the magnet retaining pocket by being inserted into the first bore portion to deflect the tongue and slid into the second bore portion, such that the first attachment member of the magnet engages the second attachment member of the second bore portion, until the magnet is exposed through the opening.

According to an embodiment, the faceplate is adapted to magnetically attach to the control device via the magnet. According to another embodiment, the faceplate comprises a first faceplate portion and a second faceplate portion, wherein the first faceplate portion is adapted to magnetically attach to the second faceplate portion via the magnet. According to yet another embodiment, the faceplate comprises at least one trim plate, wherein the at least one trim plate is adapted to magnetically attach to the faceplate via the magnet.

According to an embodiment, the first attachment member comprises a groove, and wherein the second attachment member comprises a rim adapted to engage the groove. According to another embodiment, the first attachment member comprises a rim, and wherein the second attachment member comprises a groove adapted to engage the rim. According to an embodiment, the bore is defined by an outer peripheral wall. According to an embodiment, the tongue comprises a first hinged end and a second terminal end shaped complementary to a side wall of the magnet. The opening may be defined by an outer peripheral wall of the bore and the second terminal end of the tongue. According to another embodiment, the magnet is retained in the second bore portion between an outer peripheral wall of the bore and the second terminal end of the tongue. According to another embodiment, the opening is formed through an outer surface of the faceplate such that the magnet is exposed through the outer surface of the faceplate.

According to another aspect of the embodiments, a control device is provided adapted to control at least one function of at least one associated load. The control device comprises a housing comprising a user interface, a magnet comprising a first attachment member, and a faceplate. The faceplate comprises a magnet retaining pocket defined by a bore having a first bore portion and a second bore portion, wherein the first bore portion comprises a resilient tongue, and wherein the second bore portion contains an opening and a second attachment member recessed from the openings. The magnet is retained by the magnet retaining pocket by being inserted into the first bore portion to deflect the tongue and slid into the second bore portion, such that the first attachment member of the magnet engages the second attachment member of the second bore portion, until the magnet is exposed through the opening.

According to another aspects of the embodiments, a system is provided for retaining a magnet without an adhesive comprising a magnet comprising a first attachment member, and a magnet retaining pocket. The magnet retaining pocket is defined by a bore and has a first bore portion and a second bore portion, wherein the first bore portion comprises a resilient tongue, and wherein the second bore portion contains an opening and a second attachment member recessed from the openings. The magnet is retained by the magnet retaining pocket by being inserted into the first bore portion to deflect the tongue and slid into the second bore portion, such that the first attachment member of the magnet engages the second attachment member of the second bore portion, until the magnet is exposed through the opening. According to an embodiment, the first attachment member comprises a groove, and wherein the second attachment member comprises a rim adapted to engage the groove. According to another embodiment, the first attachment member comprises a rim, and wherein the second attachment member comprises a groove adapted to engage the rim. According to an embodiment, the bore is defined by an outer peripheral wall. According to an embodiment, the tongue comprises a first hinged end and a second terminal end shaped complementary to a side wall of the magnet. The opening may be defined by an outer peripheral wall of the bore and the second terminal end of the tongue. The magnet may be retained in the second bore portion between an outer peripheral wall of the bore and the second terminal end of the tongue. According to an embodiment, the opening is formed through an outer surface of the pocket such that the magnet is exposed through the outer surface of the pocket.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
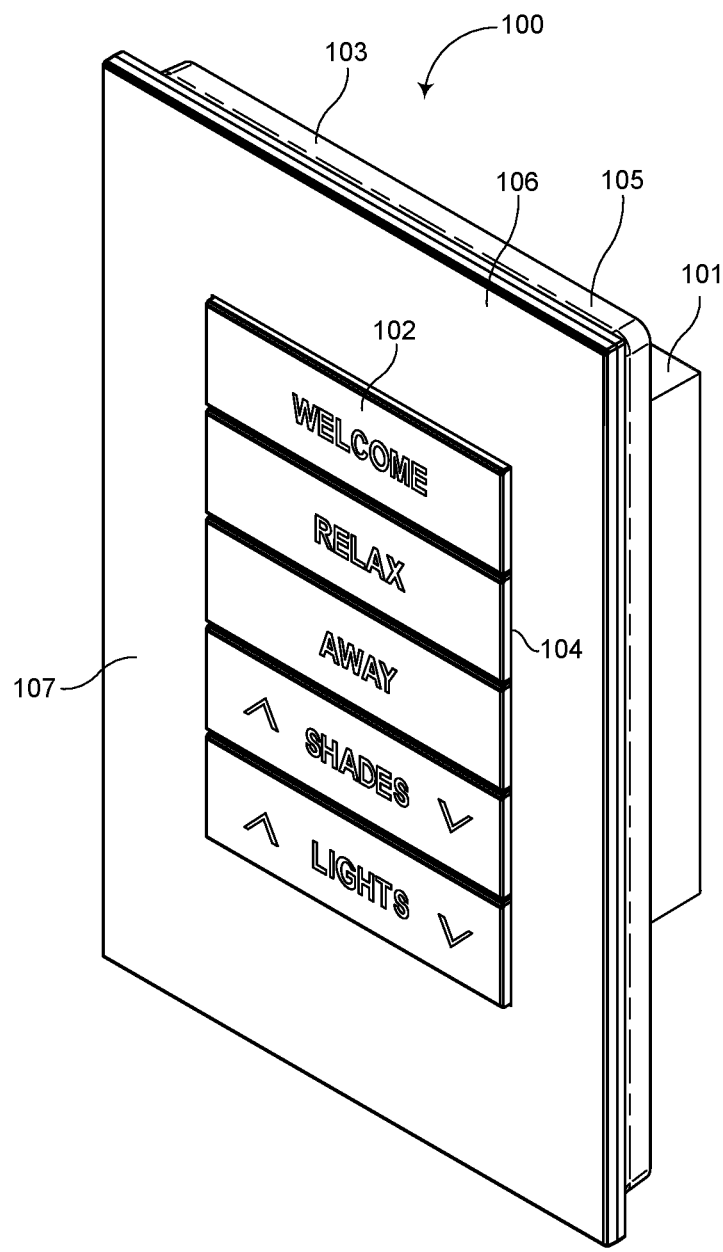

FIG. 1 illustrates a perspective front view of an illustrative wall mounted control device according to an illustrative embodiment.

Figure 2:
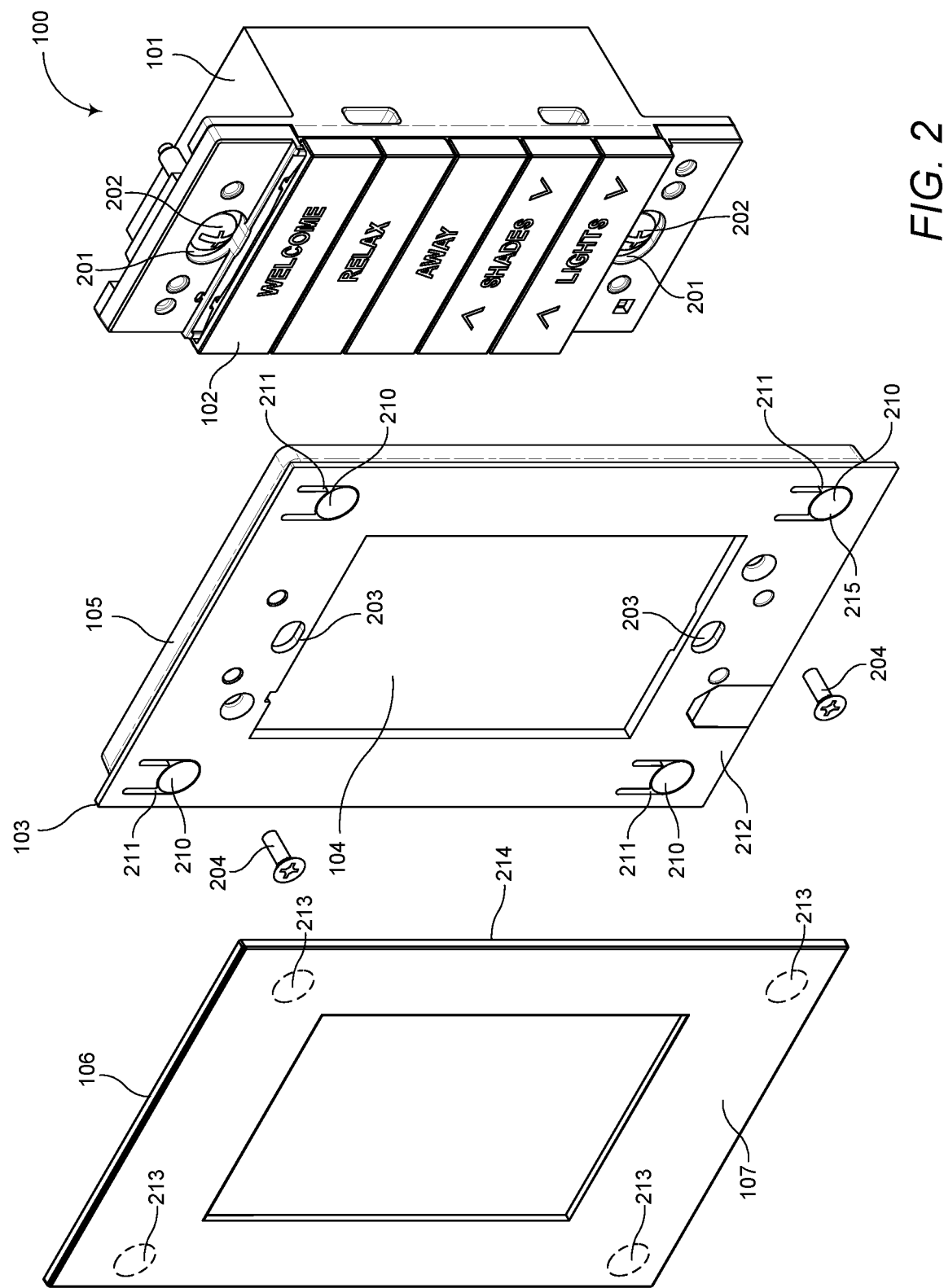

FIG. 2 illustrates a perspective front view of the control device with the faceplate removed according to an illustrative embodiment.

Figure 3A:
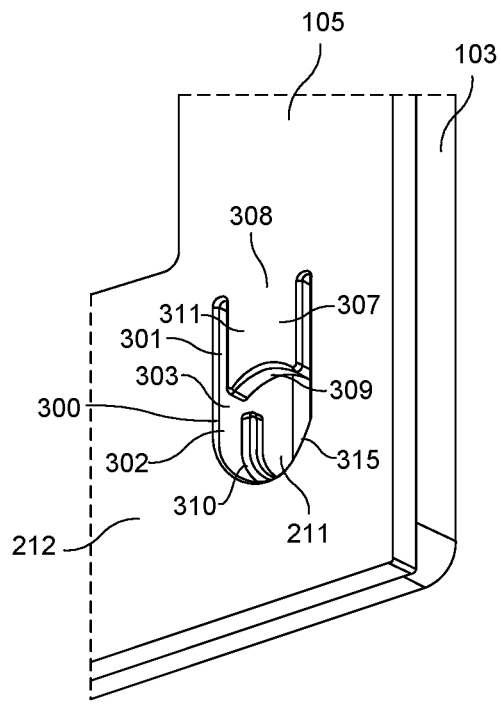

FIG. 3A illustrates a partial perspective front view of a magnet retaining pocket in a first faceplate portion according to an illustrative embodiment.

Figure 3B:
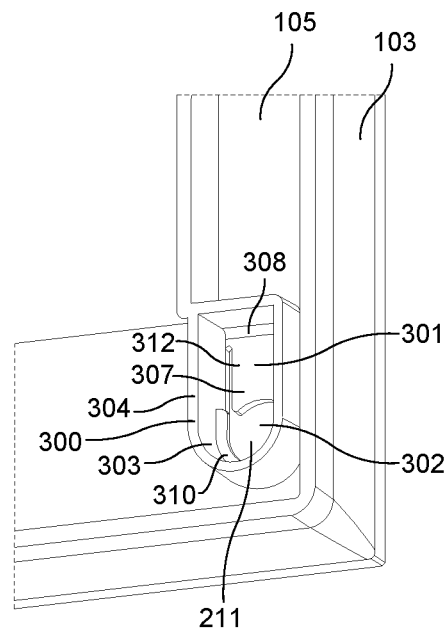

FIG. 3B illustrates a partial perspective rear view of the magnet retaining pocket in the first faceplate portion according to an illustrative embodiment.

Figure 3C:
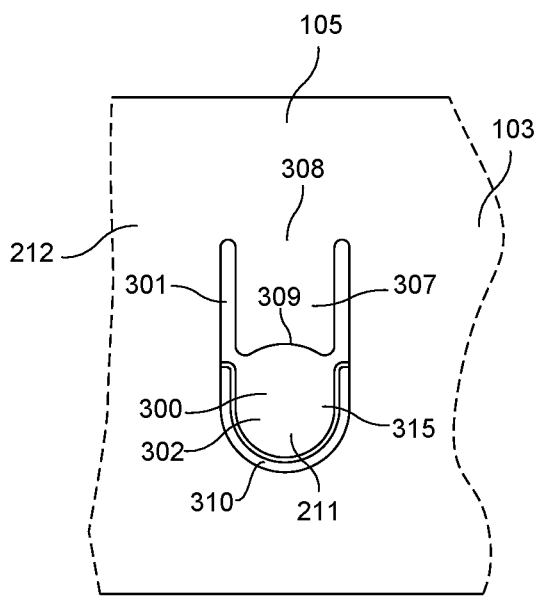

FIG. 3C illustrates a partial front view of the magnet retaining pocket in the first faceplate portion according to an illustrative embodiment.

Figure 4:
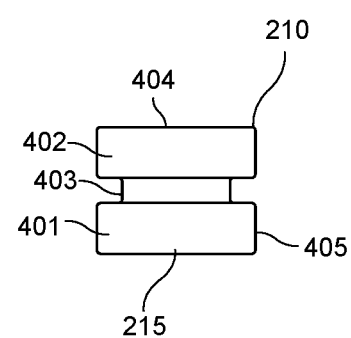

FIG. 4 illustrates a side view of the magnet according to an illustrative embodiment.

Figure 5A:
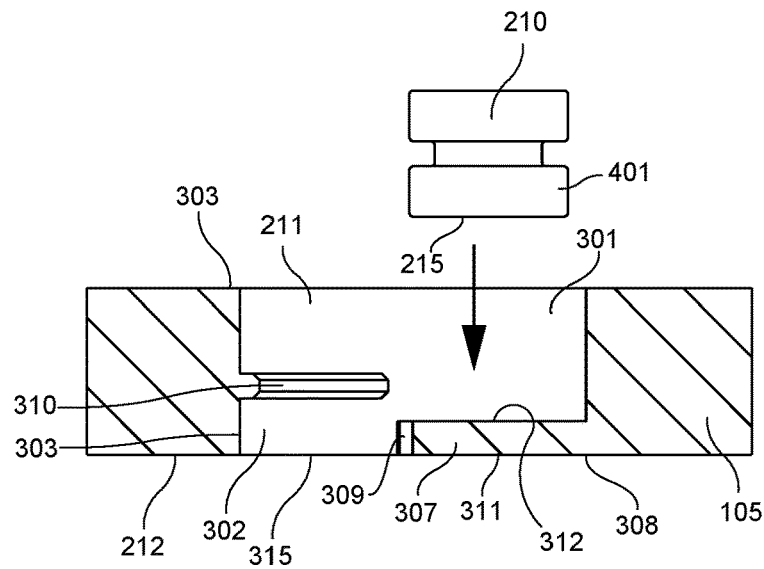

FIG. 5A illustrates a side cross sectional view of the first faceplate portion with the magnet removed according to an illustrative embodiment.

Figure 5B:
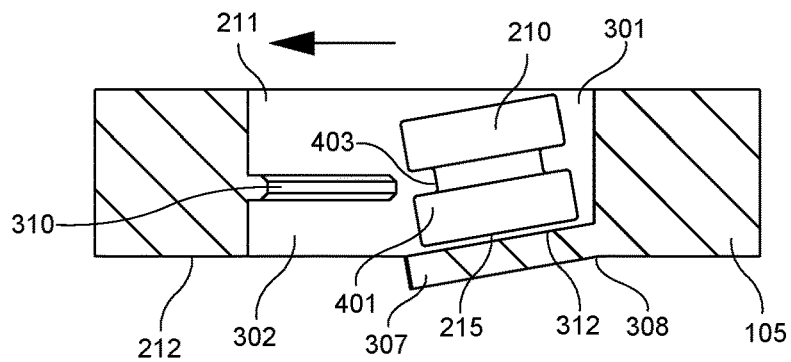

FIG. 5B illustrates a side cross sectional view of the first faceplate portion with the magnet being installed according to an illustrative embodiment.

Figure 5C:
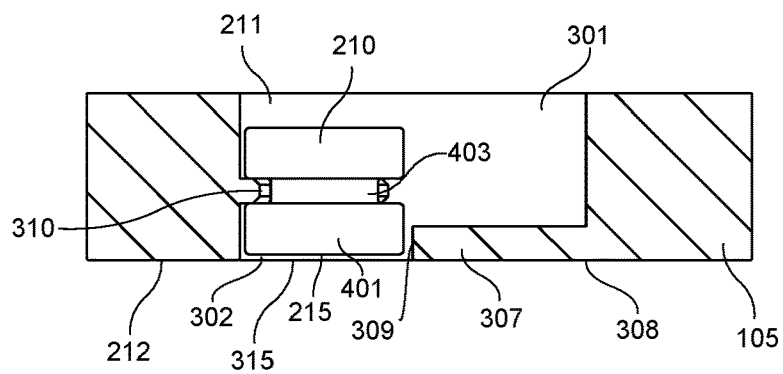

FIG. 5C illustrates a side cross sectional view of the first faceplate portion with the magnet installed according to an illustrative embodiment.

Figure 6:
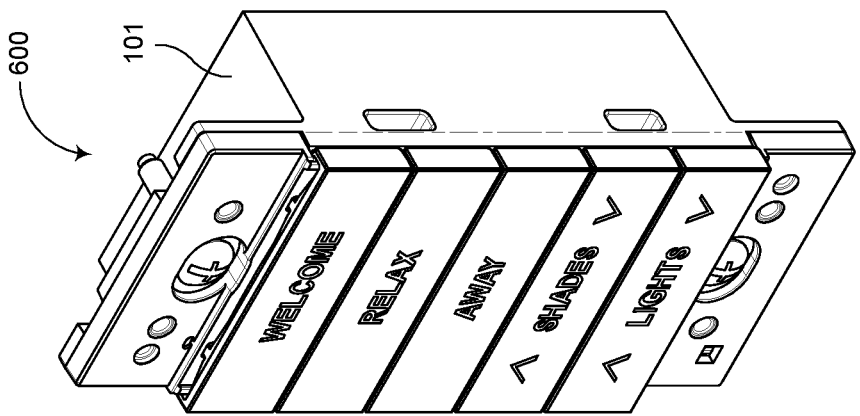
Figure 6:
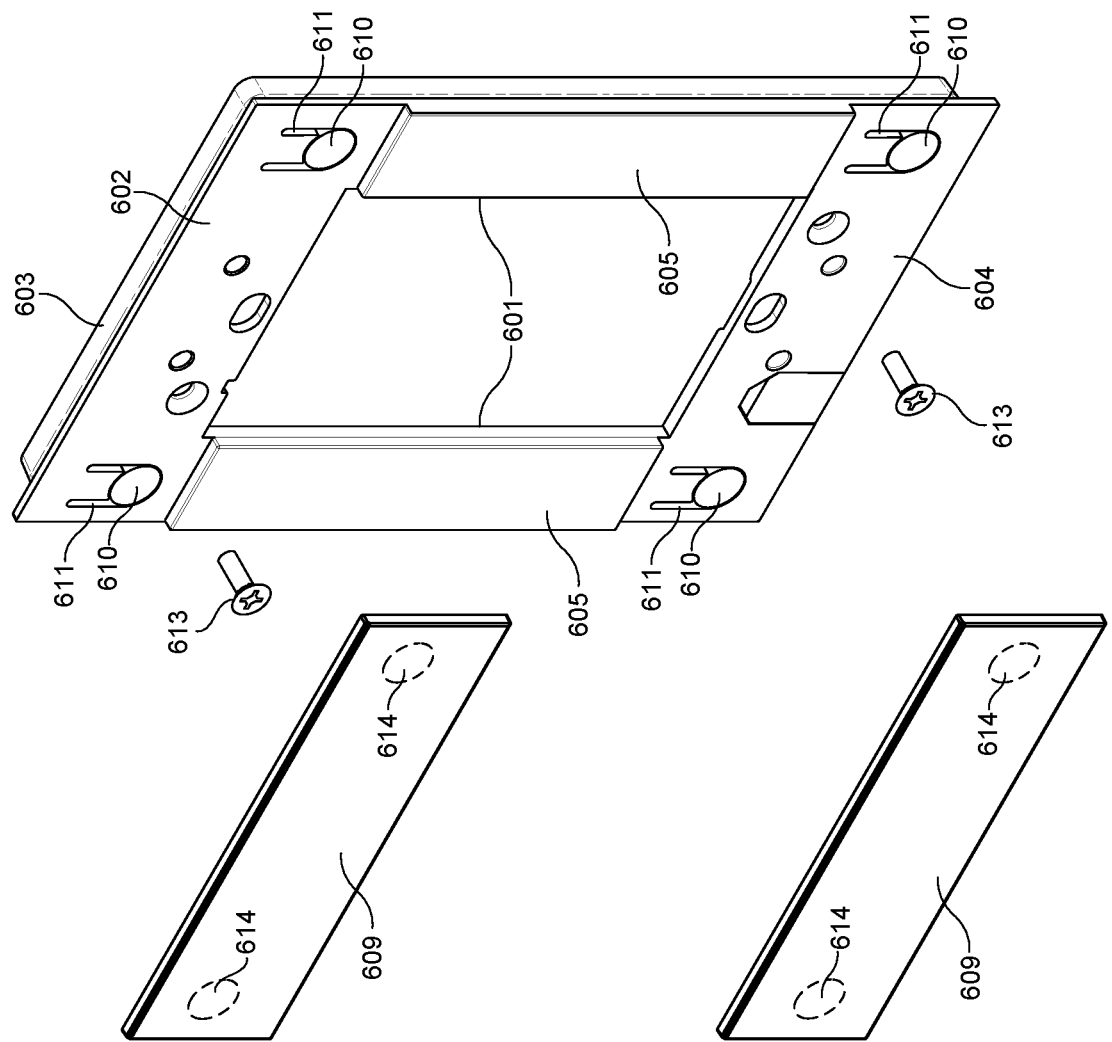

FIG. 6 illustrates a perspective front view of the control device with a faceplate according to another illustrative embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
- 100 Control Device
- 101 Housing
- 102 Button(s)
- 103 Faceplate
- 104 Opening
- 105 First Faceplate Portion
- 106 Second Faceplate Portion
- 107 Decorative Front Surface of the Second Faceplate Portion
- 201 Mounting Hole(s)
- 202 Screw(s)
- 203 Hole(s)
- 204 Screw(s)
- 210 Magnet(s)
- 211 Magnet Retaining Pocket(s)
- 212 Front Surface of the First Faceplate Portion
- 213 Metal Plate(s)

215 Front Surface of the Magnet
300 Elongated Bore
301 First Bore Portion
302 Second Bore Portion
303 Outer Peripheral Wall
304 Rear Surface
307 Resilient Tongue
308 First End of the Tongue
309 Second Terminal End of the Tongue
310 Rim
311 Front Surface of the Tongue
312 Rear Surface of the Tongue
315 Opening
401 First Magnet Portion
402 Second Magnet Portion
403 Groove
404 Rear Surface of the Magnet
405 Side Wall of the Magnet
600 Control Device
601 Pair of Vertical Side Walls
602 Horizontal Top Wall
603 Faceplate
604 Horizontal Bottom Wall
605 Decorative Front Surface
607 Shoulder(s)
609 Trim Plates
610 Magnet(s)
611 Magnet Retaining Pocket(s)
613 Screws
614 Metal Plate(s)

MODE(S) FOR CARRYING OUT THE INVENTION

The different aspects of the embodiments described herein pertain to the context of magnet installation, for example in a faceplate of a wall mounted control devices, but are not limited thereto, except as may be set forth expressly in the appended claims. While the present embodiments, including the magnet retaining pockets, are discussed herein with respect to installing magnets in a faceplate, this implementation is merely exemplary as the present embodiments may be implemented in other electrical or non-electrical devices where removable magnet attachment between components is desired without the use of adhesives.

Referring to FIG. 1, there is shows a perspective front view of an illustrative wall mounted control device 100. Control device 100 may serve as a user interface to control associated loads, load controllers, or other types of electronic devices, such as audiovisual (AV) equipment, lighting, shades, screens, computers, laptops, heating, ventilation and air conditioning (HVAC), security, appliances, and other equipment. Control device 100 may be used in residential load control, or in commercial settings, such as classrooms or meeting rooms.

Control device 100 may comprise a user interface in the form of one or more buttons, such as five buttons 102. However, other types of user interface may be utilized without departing from the scope of the present embodiments. For example, user interface may comprise a toggle switch, a push button, a rockers, a slider, a rotary switch, or the like. Each button 102 may be associated with a particular load and/or to a particular operation of a load. For example, one or more of the buttons 102 may be configured as a lighting switch, a dimmer, or may correspond to a lighting scene.

Reference is now made to FIGS. 1 and 2, where FIG. 2 shows the control device 100 with the faceplate 103 removed. Control device 100 may comprise a housing 101 adapted to house various electrical components configured for providing various functionality to the control device 100, such as a power supply, an electrical printed circuit board (PCB), relays, communication interfaces, sensors, or the like, or any combinations thereof. Housing 101 is further adapted to carry the buttons 102 thereon. Buttons may be freestanding as shown in FIG. 2 or they may be surrounded by a bezel (not shown). Housing 101 may comprise mounting holes 201 for mounting the control device 100 to a standard electrical box via screws 202. According to another embodiment, control device 100 may be mounted to other surfaces using a dedicated enclosure. According yet to another embodiment, the control device 100 may be configured to sit freestanding on a surface, such as a table, via a table-top enclosure.

Once mounted to a wall or an enclosure, housing 101 may be covered using a faceplate 103. In an illustrative embodiment, the buttons 102 and faceplate 103 may be fabricated from plastic, where the particular color of the plastic is selected to aesthetically match an overall installation. Although buttons 102 and/or faceplate 103 may comprise any type of decorative material, such as plastic, metal, glass, wood, fabric, leather, marble, stone, composite materials, or the like, or any combinations thereof. Faceplate 103 may comprise an opening 104 sized and shaped for receiving the buttons 102 therein.

Faceplate 103 may comprise a first faceplate portion 105 and a second faceplate portion 106. First faceplate portion 105 may comprise holes 203 for securing faceplate 103 to the housing 101 using screws 204. Second faceplate portion 106 may comprise a decorative front surface 107 and is magnetically attached to the first faceplate portion 105 via magnets 210 and corresponding metal plates or discs 213. Accordingly, faceplate 103 can be easily installed and removed from the control device 100 and provides a screwless decorative appearance. Magnets 210 are retained in magnet retaining pockets 211 formed in the first faceplate portion 105 of the faceplate 103. The second faceplate portion 106 comprises metal plates or discs 213 exposed at its rear surface 214 that correspond to the locations of the magnets 210 in the first faceplate portion 105. Four round magnets 210 and metal plates 213 may be used at each corner of the faceplate 103, although other number, location, and shape of magnets and/or metal plates may be implemented without departing from the scope of the present embodiments. Beneficially, the magnet retaining pockets 211 retain the magnets 210 through a quick and easy installation and without the use of adhesives such that the front surfaces 215 of the magnets 210 are exposed through and on the same plane as the front surface 212 of the first faceplate portion 105.

FIG. 4 illustrates a side view of the magnet 210 containing a front surface 215, a rear surface 404, and a side wall 405 extending therebetween. Side wall 405 contains a first attachment member, for example in the form of a groove 403 formed therein defining a first magnet portion 401 and a second portion 402. While the first and second magnet portions 401 and 402 are shown of the same shape and size, they can be differently shaped and sized.

Referring now to FIGS. 3A-3C, there is shown a partial perspective front view, partial perspective rear view, and a partial front view of the magnet retaining pocket 211 in the first faceplate portion 105 of the faceplate 103. Each magnet retaining pocket 211 may be formed as a separate structure from the first faceplate portion 105, or as shown in the present figures, magnet retaining pockets 211 may be formed as part of the first faceplate portion 105. Each magnet retaining pocket 211 comprises an elongated bore 300 defined by an outer peripheral wall 303 that rearwardly and laterally extends from the front surface 212 of the first faceplate portion 105 to a rear surface 304. The bore contains a first bore portion 301 sized and used to receive the magnet 210 during installation and a second bore portion 302 sized and used to retain the magnet 210. The first bore portion 301 contains a resilient tongue 307 that partially covers the first bore portion 301. Tongue 307 comprises a front surface 311 and a rear surface 312 that extend from a first end 308, hingedly connected to the outer peripheral wall 303, to a second terminal end 309 shaped complementary to the side wall 405 of the first magnet portion 401. The front surface 311 of the tongue 307 may be coplanar with the front surface 212 of the first faceplate portion 105. Tongue 307 is adapted to deflect at its first end 308 with respect to the front surface 212 of the first faceplate portion 105 if pressed, but is adapted to retain its position when external force is removed.

The second bore portion 302 contains an opening 315 through the front surface 212 formed by a portion of the outer peripheral wall 303 and the second terminal end 309 of the tongue 307. Opening 315 is adapted and is sized to expose the front surface 215 of the first magnet portion 401 of the magnet 210 when installed. The second bore portion 302 also contains a second attachment member, for example in the form of a rim 310 inwardly extending from the outer peripheral wall 303 that is recessed with respect to the front surface 212, and thereby the opening 315. Rim 310 is sized and shaped to fit within the groove 403 formed in the magnet 210 and is spaced from the front surface 212 by a distance adapted to accommodate the depth of the first agent portion 401.

Referring now to FIGS. 5A-5C, there are shown side cross sectional views of the first faceplate portion 105 of the faceplate 103 illustrating the steps of installing the magnet 210 in the magnet retaining pocket 211. First, as shown in FIG. 5A, the magnet 210 is inserted into the first bore portion 301 from the rear surface 303 of the magnet retaining pocket 211 until the front surface 215 of the first magnet portion 401 contacts the rear surface 312 of the tongue 307. The magnet 210 is then pushed down to deflect the tongue 307 at its first end 308 with respect to the front surface 212 of the first faceplate portion 105 as shown in FIG. 5B. The magnet 210 is then slid from the first bore portion 301 to the second bore portion 302 such that rim 310 is slid within and engages the groove 403 in the magnet 210 as shown in FIG. 5C. Once the magnet 210 is fully slid into the second bore portion 302 such that the first magnet portion 401 is located within opening 315, the tongue 307 will no longer be deflected by the magnet 210 and will return to its original position. This will cause the magnet 210 to be locked within the second bore portion 302 of the magnet retaining pocket 211 via rim 310 and second terminal end 309 of the tongue 307.

According to an alternative embodiment, the magnet 210 may be provided with the rim 310 and the second bore portion 302 may be provided with a groove 403 without departing from the scope of the present embodiments.

The magnet retaining pocket 211 may be used to retains portions of other types of faceplates. For example, referring to FIG. 6, faceplate 603 may comprise a pair of vertical side walls 601 interconnected by a horizontal top wall 602 and a horizontal bottom wall 604, each containing one or more magnet retaining pockets 611 retaining magnets 610 therein in a similar manner as discussed above with reference to FIGS. 1-5. The pair of vertical side walls 601 may each comprise a decorative front surface 605. Faceplate 603 may be attached to the control device 600 via screws 613. Horizontal top and bottom walls 602 and 604 are each adapted to receive a decorative trim plate 609 thereon to cover the screws 613. The horizontal top and bottom walls 602 and 604 may be recessed back from the decorative front surfaces 605 such that the trim plates 609 are flush with the decorative front surfaces 605 of the pair of vertical side walls 601. Trim plates 609 may be removably attached to the top and bottom horizontal walls 602 and 604 using magnets 610 and metal plates 614 in a similar manner as discussed above with reference to FIGS. 1-5.

INDUSTRIAL APPLICABILITY

The disclosed embodiments provide an apparatus, system, and method for an improved magnet installation. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A faceplate for a control device comprising:
a magnet comprising a first attachment member; and
a magnet retaining pocket defined by a bore having a first bore portion and a second bore portion, wherein the first bore portion comprises a resilient tongue, and wherein the second bore portion contains an opening and a second attachment member recessed from the openings;
wherein the magnet is retained by the magnet retaining pocket by being inserted into the first bore portion to deflect the tongue and slid into the second bore portion, such that the first attachment member of the magnet engages the second attachment member of the second bore portion, until the magnet is exposed through the opening.

2. The faceplate of claim 1, wherein the faceplate is adapted to magnetically attach to the control device via the magnet.

3. The faceplate of claim 1, wherein the faceplate comprises a first faceplate portion and a second faceplate portion, wherein the first faceplate portion is adapted to magnetically attach to the second faceplate portion via the magnet.

4. The faceplate of claim 1, wherein the faceplate comprises at least one trim plate, wherein the at least one trim plate is adapted to magnetically attach to the faceplate via the magnet.

5. The faceplate of claim 1, wherein the first attachment member comprises a groove, and wherein the second attachment member comprises a rim adapted to engage the groove.

6. The faceplate of claim 1, wherein the first attachment member comprises a rim, and wherein the second attachment member comprises a groove adapted to engage the rim.

7. The faceplate of claim 1, wherein the bore is defined by an outer peripheral wall.

8. The faceplate of claim 1, wherein the tongue comprises a first hinged end and a second terminal end shaped complementary to a side wall of the magnet.

9. The faceplate of claim 8, wherein the opening is defined by an outer peripheral wall of the bore and the second terminal end of the tongue.

10. The faceplate of claim 8, wherein the magnet is retained in the second bore portion between an outer peripheral wall of the bore and the second terminal end of the tongue.

11. The faceplate of claim 1, wherein the opening is formed through an outer surface of the faceplate such that the magnet is exposed through the outer surface of the faceplate.

12. A control device adapted to control at least one function of at least one associated load comprising:
a housing comprising a user interface;
a magnet comprising a first attachment member; and
a faceplate comprising a magnet retaining pocket defined by a bore having a first bore portion and a second bore portion, wherein the first bore portion comprises a resilient tongue, and wherein the second bore portion contains an opening and a second attachment member recessed from the openings;
wherein the magnet is retained by the magnet retaining pocket by being inserted into the first bore portion to deflect the tongue and slid into the second bore portion, such that the first attachment member of the magnet engages the second attachment member of the second bore portion, until the magnet is exposed through the opening.

13. A magnet retaining pocket for retaining a magnet without an adhesive, wherein the magnet comprises a first attachment member, the magnet retaining pocket comprises:
a bore having a first bore portion and a second bore portion, wherein the first bore portion comprises a resilient tongue, and wherein the second bore portion contains an opening and a second attachment member recessed from the openings;
wherein the magnet is retained by the magnet retaining pocket by being inserted into the first bore portion to deflect the tongue and slid into the second bore portion, such that the first attachment member of the magnet engages the second attachment member of the second bore portion, until the magnet is exposed through the opening.

14. The magnet retaining pocket of claim 13, wherein the first attachment member comprises a groove, and wherein the second attachment member comprises a rim adapted to engage the groove.

15. The magnet retaining pocket of claim 13, wherein the first attachment member comprises a rim, and wherein the second attachment member comprises a groove adapted to engage the rim.

16. The magnet retaining pocket of claim 13, wherein the bore is defined by an outer peripheral wall.

17. The magnet retaining pocket of claim 13, wherein the tongue comprises a first hinged end and a second terminal end shaped complementary to a side wall of the magnet.

18. The magnet retaining pocket of claim 17, wherein the opening is defined by an outer peripheral wall of the bore and the second terminal end of the tongue.

19. The magnet retaining pocket of claim 17, wherein the magnet is retained in the second bore portion between an outer peripheral wall of the bore and the second terminal end of the tongue.

20. The magnet retaining pocket of claim 13, wherein the opening is formed through an outer surface of the pocket such that the magnet is exposed through the outer surface of the pocket.

* * * * *